Patented July 31, 1951

2,562,705

UNITED STATES PATENT OFFICE 2,562,705

LITHIUM MANGANITE AND METHOD OF PRODUCING SAME

Reuben B. Ellestad, Robert M. Stewart, and Bernard R. Babbitt, Minneapolis, Minn., assignors to Metalloy Corporation, Minneapolis, Minn., a corporation of Minnesota No Drawing. Application August 1, 1946, Serial No. 687,704

9 Claims. (Cl. 23—58)

Our invention relates to the production of a new and highly useful compound, lithium manganite, having the formula $Li_2MnO_3$. The compound has utility for a variety of purposes in the ceramic and metallurgical industries, as a constituent of porcelain enamel type coatings for iron and steel, and in welding rod coatings.

The compound may be prepared by heating, at elevated reaction temperatures for a time sufficient to enable the reaction to be completed, an oxygen-containing lithium compound, notably lithium carbonate, lithium oxide or lithium hydroxide, with a manganese oxide or hydroxide or a manganese salt which, at the elevated reaction temperatures involved, undergoes thermal decomposition to produce an oxide of manganese. Typical of such manganese salts are manganese carbonate ($MnCO_3$), manganese sulfate ($MnSO_4$), and manganese nitrate ($Mn(NO_3)_2$).

Where manganese dioxide is utilized, the reaction may be carried out in either a neutral or oxidizing atmosphere. Where manganese carbonate or other manganous or divalent manganese compounds or oxides of manganese lower than manganese dioxide (e. g. $Mn_3O_4$, $Mn_2O_3$, and $MnO$) are employed, the reaction is effected in an oxidizing atmosphere. While relatively pure oxygen atmospheres may be maintained in the furnace or like equipment during the reaction, this is unnecessary as excellent results are obtained by using air as the oxidizing atmosphere.

Where lithium carbonate, for example, is reacted with manganese dioxide or manganese carbonate, said ingredients react in equi-molal proportions to produce the lithium manganite. Where oxides of manganese lower than manganese dioxide are employed in the reaction with lithium carbonate, as, for example, $Mn_3O_4$, the ratio of the reactants should be such that for each atom of manganese there are approximately two atoms of lithium. While an excess of either of the two reactants may be utilized in the reaction, it simply serves to contaminate the lithium manganite which is produced in the reaction. In general, therefore, we prefer to employ proportions of reactants in approximately the molal ratios in which they will react to produce the lithium manganite.

The reaction between the lithium and manganese compounds to produce the lithium manganite takes place, as previously pointed out, at elevated temperatures. In general, the reaction appears to begin in the neighborhood of about 560 degrees C. At temperatures around 680 degrees C., the reaction is usually from 80% to 90% completed after 40 minutes of heating. In order to obtain substantially complete reaction between the reactants, we prefer, in most cases to carry out the heating at about 900 degrees C. to about 1100 degrees C. for about 1 or 2 hours or more. It will be understood that time and temperature are reciprocal factors.

The following examples are illustrative of the practice of the invention. It will be appreciated that other manganese and lithium compounds may be utilized, the proportions of reactants and temperatures may be varied and other modifications resorted to which will be evident to those skilled in the art in the light of the guiding principles disclosed herein.

Example 1

(a) Equi-molal proportions of lithium carbonate and manganese carbonate were well mixed together and heated at about 1000 degrees C. for 1 hour in a tube furnace in a current of oxygen. The product obtained was a bright red powder, showing no sign of fusion or sintering, and free of carbon dioxide. On analysis, the product was found to correspond to the formula $Li_2MnO_3$.

(b) A sample of the product produced in part (a) was placed in a boat and heated for 2 hours in a tube furnace at 1100 degrees C. The color of the product changed from the original bright red to a dark brown but without any indication of fusion. Analysis of said dark brown product showed that it still corresponded to the formula $Li_2MnO_3$. The color of the compound is, therefore, no index of its composition. The difference in color may possibly be due to factors relating to particle size. Lithium manganite is stable at temperatures of at least 1100 degrees C.

(c) Samples of the bright red lithium manganite and the dark brown lithium manganite, produced as described in parts (a) and (b), respectively, were subjected to X-ray diffraction tests. The results showed that, structurally, the two samples were identical. Moreover, the sharp photographs obtained demonstrated that the products were crystalline.

Example 2

Equi-molal proportions of lithium carbonate and manganese carbonate were reacted, as described in part (a) of Example 1, with the exception that a current of air was substituted for the current of oxygen. The resulting bright red product, on analysis, was shown to correspond to the formula $Li_2MnO_3$.

Example 3

A mixture of 235 pounds of a natural manganese dioxide ore and technical lithium carbonate, in approximately equi-molal proportions of contained manganese dioxide and lithium carbonate, was heated at 950–1000 degrees C. for 2 hours in a hearth-type gas-fired furnace and yielded 172 pounds of technical lithium manganite.

It will be understood that it is unnecessary to use pure or substantially pure sources of the lithium and manganese compounds. Technical grades may be employed as well as natural ores containing substantial proportions of the lithium and manganese reactants if technical lithium manganite is desired to be produced. Where, however, pure or substantially pure lithium manganite is desired, correspondingly pure reactants should be utilized.

In carrying out the reaction, the lithium and manganese compounds to be reacted should be well mixed and, during the heating operation, it is desirable to rabble the mixture periodically to insure even heat penetration and consequent complete reaction.

While the invention has been described in detail, it is to be understood that the scope thereof is not to be limited other than is set forth in the claims.

What we claim as new and desire to protect by Letters Patent of the United States is:

1. A new chemical compound, lithium manganite, corresponding to the formula $Li_2MnO_3$.

2. A process for the production of lithium manganite which comprises heating, at a temperature of at least 560 degrees C. but below the temperature of decomposition of lithium manganite, at least one lithium compound selected from the group consisting of lithium carbonate, lithium oxide and lithium hydroxide, with an oxygen-containing manganese compound which, at said elevated reaction temperature, is present as a manganese oxide.

3. A process for the production of lithium manganite which comprises heating a mixture of lithium carbonate and manganese carbonate in an oxidizing atmosphere at a temperature of at least 560 degrees C. but below the temperature of decomposition of lithium manganite.

4. A process for the production of lithium manganite which comprises heating a mixture of lithium carbonate and manganese dioxide in an atmosphere selected from the group consisting of neutral and oxidizing atmospheres and at a temperature of at least 560 degrees C. but below the temperature of decomposition of lithium manganite.

5. A process for the production of lithium manganite which comprises heating a mixture of substantially equi-molal proportions of lithium carbonate and manganese dioxide at a temperature in the range of about 900 degrees C. to about 1100 degrees C. in an atmosphere selected from the group consisting of neutral and oxidizing atmospheres.

6. A process for the production of lithium manganite which comprises heating a mixture of substantially equi-molal proportions of lithium carbonate and manganese carbonate at a temperature in the range of about 900 degrees C. to about 1100 degrees C. in an oxidizing atmosphere.

7. A process for the production of lithium manganite which comprises heating a mixture of at least one lithium compound selected from the group consisting of lithium carbonate, lithium oxide and lithium hydroxide with manganese dioxide in an atmosphere selected from the group consisting of neutral and oxidizing atmospheres, said heating being carried out at a temperature in the range of about 560 degrees C. to about 1100 degrees C.

8. A process for the production of lithium manganite which comprises heating, in an oxidizing atmosphere, lithium carbonate with a manganese oxide lower than manganese dioxide, the ratio of said reactants being such that there are approximately 2 atoms of lithium for each atom of manganese, the heating being carried out at a temperature of at least 560 degrees C. but below the temperature of decomposition of lithium manganite.

9. A process for the production of lithium manganite which comprises heating, at elevated reaction temperatures and in an oxidizing atmosphere, lithium carbonate with a manganous salt which, at said elevated reaction temperature, undergoes thermal decomposition to produce an oxide of manganese, the ratio of said reactants being such that there are approximately 2 atoms of lithium for each atom of manganese, said elevated reaction temperatures falling within the range of at least 560 degrees C. to below the temperature of decomposition of lithium manganite.

REUBEN B. ELLESTAD.
ROBERT M. STEWART.
BERNARD R. BABBITT.

REFERENCES CITED

The following references are of record in the file of this patent:

UNITED STATES PATENTS

| Number | Name | Date |
|---|---|---|
| 2,174,570 | Doran | Oct. 3, 1939 |
| 2,403,228 | McCord | July 2, 1946 |

OTHER REFERENCES

Mellor: "Comprehensive Treatise on Inorganic and Theoretical Chemistry," vol. 12, pages 274–280, 284, 288–290, 1932, Longmans, Green & Co., N. Y. C.